United States Patent [19]

Arbir et al.

[11] 4,366,084

[45] Dec. 28, 1982

[54] CATALYST FOR MAKING POLYURETHANES

[75] Inventors: Francis W. Arbir, Itasca; Daniel S. Raden, Hawthorn Woods; Kenneth W. Narducy, Bloomingdale, all of Ill.

[73] Assignee: Abbott Laboratories, North Chicago, Ill.

[21] Appl. No.: 267,150

[22] Filed: May 26, 1981

[51] Int. Cl.$^3$ .............................................. B01J 31/02
[52] U.S. Cl. ..................................... 252/426; 564/280
[58] Field of Search ......................... 564/280; 252/426

[56] References Cited

U.S. PATENT DOCUMENTS

| | | | |
|---|---|---|---|
| 3,487,080 | 12/1969 | Matsui et al. | 252/426 |
| 3,836,488 | 9/1974 | Pruitt | 252/426 |
| 3,993,652 | 11/1976 | Bechara et al. | 252/426 |
| 4,036,792 | 7/1977 | Hopkins | 252/426 |
| 4,038,210 | 7/1977 | Rosemund | 252/426 |
| 4,049,931 | 9/1977 | Sandner | 252/426 |
| 4,115,321 | 9/1978 | Sandner et al. | 252/426 |

*Primary Examiner*—Arthur P. Demers
*Attorney, Agent, or Firm*—Robert L. Niblack; Paul D. Burgauer

[57] ABSTRACT

Polyurethane foams with excellent physical properties can be obtained by using a partial salt between N,N-dimethylaminopropane-1,3-diamine (DMAPA) and phenol.

4 Claims, No Drawings

NEW CATALYST FOR MAKING POLYURETHANES

DETAILED DESCRIPTION OF THE INVENTION

Polyurethanes are widely used where rigid, semi-rigid or flexible foams are needed. Particularly, in formulations leading to flexible products and to some extent in the others, amine catalysts are used to provide a cellular structure, with or without metal co-catalysts and/or diluents. One of the more efficient amine catalysts is DMAPA (dimethylaminopropylamine) which, however, has several detrimental properties, the most striking one of which is its fuming. This and other undesirable properties will be discussed in more detail below.

While DMAPA has some of the most useful properties as urethane catalyst among all primary/tertiary amines, the mentioned fuming is a great disadvantage and removes DMAPA from the catalyst preference list. Also, DMAPA produces buns that give rise to some waste not noted with some other amine catalysts.

It has now been found that a combination of one mole of DMAPA and 0.2–2.0 moles of phenol produces urethane foams as good or better than those obtained with DMAPA alone. The new combination, however, has significant advantages over DMAPA by being physically easy to handle due to the absence of the heavy fumes of DMAPA.

For the purpose of their description, the combination of phenol and DMAPA is often referred to as a salt. However, no intention of limiting this invention to a true salt is meant by the use of this term, particularly since there are some indications that the two materials form a complex rather than a true salt.

As mentioned before, the "salt" terminology applies only to that part of the new mixture in which all of the nitrogen functions of DMAPA are blocked by phenol. The new partial salt is made simply by mixing the two reactants in the proportion desired for use as a urethane catalyst, requiring no other manipulations than the physical combining of the appropriate portions thereof. This mixture can then be used in the formulation leading to polyurethane foams. It will be understood, however, that this invention is not limited to the use of the above partial salt between DMAPA and phenol as the sole catalyst; the partial salt can also be used in connection with tin salts, and particularly in the presence of the commonly used diluent dipropylene glycol (DPG).

To show the effect of the new catalyst, reference is made to the following examples, which, however, are for illustration only and are not intended to limit this invention in any respect. All parts and percentages shown are based on weight unless specified differently; all catalyst percentages are based on the amount of polyol used.

EXAMPLE

After mixing 100 parts of an ethylene oxide modified polypropylene glycol of a molecular weight of about 3500 (marketed as Multranol ® 7100 by Mobay Chemical Co.), 4.5 parts of water, 1.2 parts of a silicone surfactant (sold as Tegostab ® BF-2370 by Th. Goldschmidt AG), 0.5 parts of 50% stannous octoate dissolved in dioctyl phthalate and the equivalent amount of to 0.2 parts of DMAPA as partially blocked DMAPA salt in various amounts of DPG, the appropriate amount (110% of theoretically calculated stoichiometry, or 110 index) of a toluene di-isocyanate (sold as Mondur ® TD-80 marketed by Mobay Chemical) is added and stirred at 2,000 rpm for 5 seconds with a 3-inch Conn mixer at 21° C. The stirred mixture is poured into a corregated cardboard box, 17×17×15 inches, and allowed to rise, producing the results indicated below in Table I, using phenol for blocking in the shown proportions.

TABLE I

| % Blocked | 0 | 100 | 100 | 100 | 50 | 50 | 50 | 25 | 25 | 25 | 10 | 10 | 10 |
|---|---|---|---|---|---|---|---|---|---|---|---|---|---|
| % DPG | 0 | 50 | 30 | 10 | 50 | 30 | 10 | 50 | 30 | 10 | 50 | 30 | 10 |
| % Catalyst Mix | 0.2 | 1.14 | 0.81 | 0.63 | 0.77 | 0.55 | 0.43 | 0.58 | 0.42 | 0.33 | 0.47 | 0.34 | 0.26 |
| Cream time (sec) | 14 | 13 | 14 | 15 | 15 | 14 | 15 | 13 | 14 | 14 | 14 | 14 | 14 |
| 1" Rise time (sec) | 23 | 23 | 24 | 24 | 23 | 23 | 24 | 23 | 23 | 24 | 23 | 23 | 24 |
| Rise time (sec) | 95 | 95 | 98 | 98 | 96 | 95 | 96 | 92 | 95 | 95 | 94 | 93 | 94 |
| BB gel (sec) | 128 | 129 | 132 | 132 | 130 | 126 | 127 | 124 | 126 | 126 | 121 | 124 | 125 |
| Density | 1.42 | 1.44 | 1.47 | 1.49 | 1.47 | 1.45 | 1.46 | 1.46 | 1.45 | 1.44 | 1.46 | 1.47 | 1.46 |
| Air Flow | 5.3 | 4.2 | 4.2 | 5.1 | 4.4 | 4.7 | 5.0 | 5.1 | 5.0 | 5.2 | 5.3 | 4.9 | 5.3 |
| Compression set | | | | | | | | | | | | | |
| 50% | 4.70 | 5.57 | 5.58 | 5.69 | 5.29 | 5.04 | 7.07 | 4.82 | 4.72 | 4.92 | 4.71 | 5.17 | 4.45 |
| 90% | 6.49 | 8.35 | 7.85 | 7.13 | 6.72 | 6.62 | 7.05 | 6.65 | 6.85 | 6.55 | 6.38 | 6.63 | 6.63 |

The above table demonstrates that virtually no difference is seen between the foams produced where DMAPA is used alone and foams incorporating equivalent amounts of DMAPA, partially in the form of phenates with varying amounts of DPG. This is not true when organic acids, such as acetic or formic acids, are used.

The new partial salt is thus as effective as DMAPA but has a very distinct advantage thereover: in the proper range of mix with phenol and DPG, the fuming of DMAPA is entirely or essentially completely eliminated. Tests to that effect were run on the above tested catalyst mixtures (all based on 0.2% DMAPA) with the following results:

| % Blockage | % DPG | Fuming |
|---|---|---|
| 100 | 50 | None |
| 100 | 30 | " |
| 100 | 10 | " |
| 50 | 50 | " |
| 50 | 30 | " |
| 50 | 10 | " |
| 25 | 50 | " |
| 25 | 30 | Very slight on blowing |
| 25 | 10 | " |
| 10 | 50 | None |
| 10 | 30 | Slight on blowing |
| 10 | 10 | " |

The new partial salt between DMAPA and phenol is thus demonstrated to have chemical or catalytic properties at least equal to those of DMAPA but they show the unexpected, extremely important advantage of being easy to handle because of the absence of the heavy fuming of DMAPA.

The new salt, of course, is a partial salt unless 2 moles of phenol are used per mole of DMAPA. Thus, the above used 50% blocked DMAPA contains equal moles of DMAPA and phenol. The above data also shows that the amount of DPG is of little consequence; it can be present in various amounts to suit the formulator. Actually, DPG need not be present to have a catalyst mixture that is easy to handle since partial salts containing 0.2-2 moles of phenol all are liquids.

The new catalyst delays completion of the gel which helps alleviate underrunnings, splits and crescents; it promotes primary polymerization and the blowing reaction while it delays secondary reactions until just before completion of the rise. The foam is more plastic during the rise than without the presence of 0.2-2 moles of phenol; this reduces the friction effects on the side walls, producing a flatter block without top splits. Also, with the new catalyst, the tack-free time is close to the rise time for fast surface cure, providing thinner skins and less foam adhering to the walls. The delayed gel characteristics makes it easier to achieve square foam blocks, thus producing more useable foam and less waste.

Since process times increase expectedly by blocking parts of the active catalyst, the use of more than 50% blocked DMAPA becomes uneconomical, although good foams may be obtained with 60-75% blocked DMAPA.

Since catalyst mixtures usually are provided in liquid form, it is particularly noteworthy that the new salts are liquid and miscible with DPG, a solvent routinely used with free amine catalysts for urethane reactions. DPG is a favored solvent because it is a reactive participant in the fashion of the polyol used. Excellent catalyst compounds are therefore those where DMAPA is blocked by 10-50 equivalent % with a phenol and the mixture is dissolved in 50-200% DPG. A very practical and suitable solution contains one part of DMAPA/DMAPA-phenate to one part of DPG, said salt representing 10-50% of the total catalyst content.

The preferred process of the invention is the preparation of a polyurethane foam from a polyisocyanate and a polyol in the presence of one or more blowing agents, DMAPA partially blocked with a phenol and an amount of DPG equivalent to the weight of said partially blocked DMAPA. Other catalysts such as tin salts or other primary, secondary or tertiary amines may be added to said reaction mixture. Most commonly, divalent tin compounds are used in this connection, e.g., stanous octoate and the like. These additional materials would preferably be selected by the processor to best suit his individual needs. A suitable catalyst solution, according to this invention, may include 0.1-0.4% of a tin salt.

The compounds of the present invention are usable with all types of polyols and polyisocyanates. A representative list of these can be found in U.S. Pat. No. 4,212,952, col. 2, lines 60 to col. 3, line 9 and col. 2, lines 30-59, respectively.

What is claimed is:

1. A catalyst composition for preparing urethane foams consisting essentially of 3-dimethylaminopropylamine and 10-50 equivalent-% of phenol.

2. The composition of claim 1 wherein said equivalent is between 20 and 30%.

3. The composition of claim 1 dissolved in DPG.

4. The composition of claim 1 dissolved in 0.5 to 2.0 parts of DPG per part of said DMAPA and phenol.

* * * * *